(12) United States Patent
Nair

(10) Patent No.: US 11,872,784 B2
(45) Date of Patent: Jan. 16, 2024

(54) LAMITUBE AND IMPLEMENTATIONS THEREOF

(71) Applicant: EPL LIMITED, Mumbai (IN)

(72) Inventor: Hariharan Krishnan Nair, Mumbai (IN)

(73) Assignee: EPL LIMITED, Mumbai (IN)

( * ) Notice: Subject to any disclaimer, the term of this patent is extended or adjusted under 35 U.S.C. 154(b) by 0 days.

(21) Appl. No.: 17/352,187

(22) Filed: Jun. 18, 2021

(65) Prior Publication Data

US 2021/0308979 A1    Oct. 7, 2021

Related U.S. Application Data

(63) Continuation of application No. 17/282,746, filed as application No. PCT/IN2020/050863 on Oct. 7, 2020, now abandoned.

(51) Int. Cl.
| | |
|---|---|
| *B32B 1/08* | (2006.01) |
| *B32B 27/08* | (2006.01) |
| *B32B 27/32* | (2006.01) |
| *B32B 7/02* | (2019.01) |
| *B32B 7/12* | (2006.01) |

(52) U.S. Cl.
CPC .............. *B32B 1/08* (2013.01); *B32B 7/12* (2013.01); *B32B 27/08* (2013.01); *B32B 27/32* (2013.01); *B32B 2307/31* (2013.01); *B32B 2307/72* (2013.01); *B32B 2553/00* (2013.01)

(58) Field of Classification Search
CPC .... B32B 1/02; B32B 1/08; B32B 7/12; B32B 27/08; B32B 27/32; B32B 27/327; B32B 2307/31; B32B 2307/72; B32B 2250/05; B32B 2250/246; B32B 2553/00; B32B 2597/00
USPC ...................................... 428/36.91
See application file for complete search history.

(56) References Cited

U.S. PATENT DOCUMENTS

| | | | | |
|---|---|---|---|---|
| 3,817,427 A | * | 6/1974 | Neff ........................ | B29C 65/18 220/617 |
| 3,931,449 A | * | 1/1976 | Hirata ..................... | B32B 27/08 426/106 |
| 6,632,493 B1 | * | 10/2003 | Hildebrand, IV ..... | B65D 23/02 222/206 |
| 2002/0086174 A1 | * | 7/2002 | Genske ................... | B32B 27/20 428/509 |
| 2006/0188678 A1 | * | 8/2006 | Ohlsson ................. | B32B 27/32 428/218 |

| | | | | |
|---|---|---|---|---|
| 2015/0231861 A1 | | 8/2015 | Hu et al. | |
| 2016/0339663 A1 | | 11/2016 | Clare | |
| 2017/0080669 A1 | | 3/2017 | Jammet et al. | |
| 2019/0299574 A1 | * | 10/2019 | Ackermans ............... | B32B 7/12 |
| 2022/0032590 A1 | * | 2/2022 | Kern ....................... | B32B 27/32 |

FOREIGN PATENT DOCUMENTS

| | | | | |
|---|---|---|---|---|
| EP | 2 155 488 B2 | | 8/2018 | |
| GB | 2323364 A | * | 9/1998 | .......... C08L 23/0815 |
| WO | 2013/051007 A3 | | 4/2013 | |
| WO | 2013/057737 A3 | | 4/2013 | |
| WO | 2013/068809 A1 | | 5/2013 | |
| WO | 2018/042299 A1 | | 3/2018 | |
| WO | 2018/202479 A1 | | 11/2018 | |
| WO | 2019/132954 A1 | | 7/2019 | |
| WO | 2019/172932 A1 | | 9/2019 | |

OTHER PUBLICATIONS

Wikipedia.org entry for "Low-density polyethylene" (p. 1, under Properties heading), accessed Feb. 22, 2022 (4 pages total).*
Arvanitoyanni, Ioannis, S., Modified Atmosphere and Active Packaging Technologies, CRC Press, Boca Raton, p. 11. (Year: 2012).*
Ma et al., The utilization of plastics in asphalt pavements: A review, Cleaner Materials. (Year: 2021).*
Canadian Examination Report issued for Canadian Patent Application No. 3115443, dated Jun. 21, 2021 in 4 pages.
Indian Examination Report issued for Indian Patent Application No. 201921040615, dated Dec. 10, 2020 in 8 pages.
International Search Report and Written Opinion dated Dec. 22, 2020 in International Application No. PCT/IN2020/050863, in 13 pages.
Affidavit of Joachim Pietzsch in support of the opposition along with their CV and supporting documents, dated Jul. 18, 2022 in 76 pages.
Tec Talks PackSys Global, "Bottles made of transparent colorless/light-blue PET"; Fast PBL Webinar (2019).
AISA Packaging Production Machinery, "Quality Specification for PBL Tube"; Q0029.17.
Indian Patent Application No. IN202117044204, "Dimensionally Stable Recyclable Plastic Package" in 88 pages.

\* cited by examiner

*Primary Examiner* — Lee E Sanderson
(74) *Attorney, Agent, or Firm* — Knobbe, Martens, Olson & Bear, LLP

(57) ABSTRACT

The present disclosure relates to a lamitube comprising: a) a top layer comprising at least one ethylene polymer; and b) a second layer comprising at least one ethylene polymer having a first surface and a second surface, wherein the lamitube has a density in the range of 0.942-0.99 gm/cm$^3$. The present disclosure also discloses a process of manufacturing a lamitube comprising the steps of forming the layers and laminating the layers together, then slitting into reels of desired width in the range of 63-320 mm, followed by tubing from the reels.

13 Claims, No Drawings

LAMITUBE AND IMPLEMENTATIONS THEREOF

CROSS-REFERENCE TO RELATED APPLICATIONS

This application is a continuation of U.S. application Ser. No. 17/282,746, filed on Apr. 2, 2021 as the U.S. National Phase under 35. U.S.C. § 371 of International Application PCT/IN2020/050863, filed Oct. 7, 2020, which claims priority to Indian Patent Application No. 201921040615, filed Oct. 7, 2019. The disclosures of the above-described applications are hereby incorporated by reference in their entirety.

FIELD OF THE INVENTION

The present disclosure generally relates to the field of plastics, and in particular to lamitubes.

BACKGROUND OF THE INVENTION

The relative ease of manufacture of plastics, coupled with its wide functionality has made plastics a widely accepted material. Indeed, plastics have penetrated all industries as the preferred packaging material. However, the last decade has seen growing concerns surrounding the accumulation of non-biodegradable material, including plastics, and therefore a large amount of research has been focussed on recycling techniques for making plastic-use more sustainable.

WO2013057737 reveals process for recycling plastic waste comprising segregation of cleaned waste, grinding and vent extrusion to obtain molten plastic which can be re-used. Typically, plastic may only be recycled with other plastics having similar chemical and physical properties, such as backbone structure, and density. Therefore, non-cumbersome segregation of plastic waste is of high importance, especially in the scenario of day-to-day usage of large and variety of plastics.

Further, laminated plastic material is noted to allow enhancement of properties, for instance a multi-layer material may allow inclusion of aesthetic layer along with chemico-mechanical stability. In this regard, plastic laminated tubes or lamitubes are noted to have a wide market-reach with applications including cosmetic and nutraceuticals packaging.

WO2013051007 reveals laminated tube comprising high density polyethylene (HDPE), ethylene vinyl alcohol (EVOH) and at least one compatibilizer. Said tubes are noted to have 50-60% HDPE.

A tube largely made up of HDPE, has advantages of high mechanical strength. Also, such tubes can be readily recycled as part of the HDPE stream, thus making them highly favourable. However, on the flip side, such tubes are noted to possess the problems with ovality, i.e., such tubes are noted to be too stiff (due to high HDPE content) to process into a perfectly circular shape.

Although, considerable efforts have been made to overcome this problem, the present state of the art still requires a plastic packaging material that, in addition to being mechanically strong is also flexible and can be easily molded in the desired shape.

SUMMARY OF THE INVENTION

In an aspect of the present disclosure, there is provided a lamitube comprising: a) a top layer comprising at least one ethylene polymer; and b) a second layer comprising at least one ethylene polymer having a first surface and a second surface, wherein the lamitube has a density in the range of 0.942-0.99 gm/cm$^3$.

In another aspect of the present disclosure, there is a provided a process for manufacturing the lamitube comprising: a) a top layer comprising at least one ethylene polymer; and b) a second layer comprising at least one ethylene polymer having a first surface and a second surface, wherein the lamitube has a density in the range of 0.942-0.99 gm/cm$^3$, said process comprises the steps of forming the layers and laminating the layers together, then slitting into reels of desired width in the range of 63-320 mm, followed by tubing from the reels.

These and other features, aspects, and advantages of the present subject matter will be better understood with reference to the following description and appended claims. This summary is provided to introduce a selection of concepts in a simplified form. This summary is not intended to identify key features or essential features of the claimed subject matter, nor it is intended to be used to limit the scope of the claimed subject matter.

DETAILED DESCRIPTION OF THE INVENTION

Those skilled in the art will be aware that the present disclosure is subject to variations and modifications other than those specifically described. It is to be understood that the present disclosure includes all such variations and modifications. The disclosure also includes all such steps, features, compositions and compounds referred to or indicated in this specification, individually or collectively, and any and all combinations of any or more of such steps or features.

Definitions

For convenience, before further description of the present disclosure, certain terms employed in the specification, and examples are collected here. These definitions should be read in the light of the remainder of the disclosure and understood as by a person of skill in the art. The terms used herein have the meanings recognized and known to those of skill in the art, however, for convenience and completeness, particular terms and their meanings are set forth below.

The articles "a", "an" and "the" are used to refer to one or to more than one (i.e., to at least one) of the grammatical object of the article.

The terms "comprise" and "comprising" are used in the inclusive, open sense, meaning that additional elements may be included. It is not intended to be construed as "consists of only".

Throughout this specification, unless the context requires otherwise the word "comprise", and variations such as "comprises" and "comprising", will be understood to imply the inclusion of a stated element or step or group of element or steps but not the exclusion of any other element or steps.

The term "including" is used to mean "including but not limited to", "including" and "including but not limited to" are used interchangeably.

Unless defined otherwise, all technical and scientific terms used herein have the same meaning as commonly understood to one of ordinary skill in the art to which this disclosure belongs. Although methods and materials similar or equivalent to those described herein can be used in the practice or testing of the disclosure, the preferred methods, and materials are now described. All publications mentioned herein are incorporated herein by reference.

Ratios, concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a thickness range of about 50 μm-about 150 μm should be interpreted to include not only the explicitly recited limits of about 50 μm-about 150 μm, but also to include sub-ranges, such as 52 μm-150 μm, 50 μm-148 μm, and so forth, as well as individual amounts, including fractional amounts, within the specified ranges, such as 50.5 μm, 52.1 μm, and 129.9 μm, for example.

The term "ovality" used herein refers to the percentage deviation of the lamitubes from conforming to perfectly circular shape.

The term "lamitube" used herein refers to laminated tubes comprising: a) a top layer comprising at least one ethylene polymer; and b) a second layer comprising at least one ethylene polymer having a first surface and a second surface, wherein the lamitube has a density in the range of 0.942-0.99 gm/cm$^3$.

The term "favourable" used herein refers to the lamitubes of the present disclosure being readily recyclable as part of the high density polyethylene (HDPE) code #2 stream with simple methods of segregation or sorting.

The term "heat sealable blocking layer" used herein refers to a barrier layer which can also be used as sealant layer. The examples include, but are not limited to, EVOH barrier layer.

The phrase "at least one ethylene polymer" used herein refers to a combination of high density polyethylene (HDPE) and medium density polyethylene (MDPE). It may also include a polyethylene master batch (MB).

The term "stiffness" used herein refers to the resistance of a material to deformation under an applied force.

The term "young's modulus" used herein refers to the property of a material that is calculated by measuring the ratio of stress to strain incurred in the material. Young's modulus gives a measure of the stiffness of the material or the ease with which it can be stretched or bent. Higher the value of the young's modulus, lesser is the extent to which a material can be stretched or elongated, higher is the stiffness. It is measured in terms of N/m$^2$ or Pascal (Pa).

The term "melt flow index" or "MFI" used refers to the grams of polymer flowing per 10 minutes through a capillary tube. It is a measure of the ease of flowing of the polymer melt denoted in terms of g/10 min.

The term "density" used herein refers to the mass of polymer present per unit volume of the lamitube. It is measured in terms of g/cm$^3$.

The present disclosure is not to be limited in scope by the specific embodiments described herein, which are intended for the purposes of exemplification only. Functionally equivalent products, compositions, and methods are clearly within scope of the disclosure, as described herein.

As mentioned in the background section, there is a need for tubes that can overcome the problem associated with ovality. Multi-layer laminated tubes involving a mixture of low-density plastics can provide a possible solution, however, in such cases the compatibility with HDPE recycle streams is noted to drastically reduce. Therefore, there is need for lamitubes that offer both low ovality and are environmentally friendly to use. The present disclosure provides a lamitube comprising: a) a top layer comprising at least one ethylene polymer; and b) a second layer comprising at least one ethylene polymer having a first surface and a second surface, wherein the lamitube has a density in the range of 0.942-0.99 gm/cm$^3$. The present lamitube, having density on the higher side, allows easy recyclability in the HDPE recycling stream. Moreover, despite the high density, the lamitube shows surprisingly low ovality in the range of 1-8%. Hence, in view of the above-mentioned superior properties, the lamitube of the present disclosure would open new opportunities in the realm of currently used packaging materials.

In an embodiment of the present disclosure there is provided a lamitube comprising: a) a top layer comprising at least one ethylene polymer; and b) a second layer comprising at least one ethylene polymer having a first surface and a second surface, wherein the lamitube has a density in the range of 0.942-0.99 gm/cm$^3$. In another embodiment of the present disclosure, the lamitube has a density in the range of 0.945-0.975 gm/cm$^3$. In another embodiment of the present disclosure, the lamitube has a density in the range of 0.950-0.970 gm/cm$^3$.

In an embodiment of the present disclosure, there is provided a lamitube as described herein, wherein the lamitube has a tube ovality in the range of 1-8%. In another embodiment of the present disclosure, the lamitube has a tube ovality in the range of 1.5-7.5%. In another embodiment of the present disclosure, the lamitube has a tube ovality in the range of 2.0-6.0%.

In an embodiment of the present disclosure, there is provided a lamitube as described herein, wherein the top layer comprises 1-3 layers and has a thickness in the range of 50 μm-150 μm. In one another embodiment of the present disclosure, the top layer comprises 2-3 layers. In yet another embodiment of the present disclosure, the top layer has a thickness in the range of 100 μm-150 μm. In one another embodiment of the present disclosure, the top layer has a thickness in the range of 90 μm-130 μm. In yet another embodiment of the present disclosure, the top layer has a thickness in the range of 100 μm-115 μm.

In an embodiment of the present disclosure there is provided a lamitube comprising: a) a top layer comprising at least one ethylene polymer; and b) a second layer comprising at least one ethylene polymer having a first surface and a second surface, wherein the lamitube has a density in the range of 0.942-0.99 gm/cm$^3$ and the top layer comprises 1-3 layers and has a thickness in the range of 50 μm-150 μm.

In an embodiment of the present disclosure there is provided a lamitube comprising: a) a top layer comprising at least one ethylene polymer; and b) a second layer comprising at least one ethylene polymer having a first surface and a second surface, wherein the lamitube has a density in the range of 0.942-0.99 gm/cm$^3$ and the lamitube has a tube ovality in the range of 1-8% and the top layer comprises 1-3 layers and has a thickness in the range of 50 μm-150 μm.

In an embodiment of the present disclosure, there is provided a lamitube as described herein, wherein the second layer comprises 1-11 layers. In another embodiment of the present disclosure, the second layer comprises 2-10 layers. In another embodiment of the present disclosure, the second layer comprises 3-7 layers.

In an embodiment of the present disclosure there is provided a lamitube comprising: a) a top layer comprising at least one ethylene polymer; and b) a second layer comprising at least one ethylene polymer having a first surface and a second surface, wherein the lamitube has a density in the range of 0.942-0.99 gm/cm³, the top layer comprises 1-3 layers and has a thickness in the range of 50 μm-150 μm, and the second layer comprises 1-11 layers.

In an embodiment of the present disclosure there is provided a lamitube comprising: a) a top layer comprising at least one ethylene polymer; and b) a second layer comprising at least one ethylene polymer having a first surface and a second surface, wherein the lamitube has a density in the range of 0.942-0.99 gm/cm³, the lamitube has a tube ovality in the range of 1-8%, the top layer comprises 1-3 layers and has a thickness in the range of 50 μm-150 μm, and the second layer comprises 1-11 layers.

In an embodiment of the present disclosure, there is provided a lamitube as described herein, wherein the lamitube further comprises at least one first adhesive layer present between the top layer and the first surface of second layer.

In an embodiment of the present disclosure there is provided a lamitube comprising: a) a top layer comprising at least one ethylene polymer; and b) a second layer comprising at least one ethylene polymer having a first surface and a second surface, wherein the lamitube has a density in the range of 0.942-0.99 gm/cm³, the lamitube has a tube ovality in the range of 1-8%, the top layer comprises 1-3 layers and has a thickness in the range of 50 μm-150 μm, the second layer comprises 1-11 layers, and the lamitube further comprises at least one first adhesive layer present between the top layer and the first surface of second layer.

In an embodiment of the present disclosure, there is provided a lamitube as described herein, wherein the lamitube further comprises a third layer, wherein the third layer is a sealant layer.

In an embodiment of the present disclosure there is provided a lamitube comprising: a) a top layer comprising at least one ethylene polymer; and b) a second layer comprising at least one ethylene polymer having a first surface and a second surface, wherein the lamitube has a density in the range of 0.942-0.99 gm/cm³, the lamitube further comprises at least one first adhesive layer present between the top layer and the first surface of second layer, and the lamitube further comprises a third layer, wherein the third layer is a sealant layer.

In an embodiment of the present disclosure there is provided a lamitube comprising: a) a top layer comprising at least one ethylene polymer; and b) a second layer comprising at least one ethylene polymer having a first surface and a second surface, wherein the lamitube has a density in the range of 0.942-0.99 gm/cm³, the lamitube has a tube ovality in the range of 1-8%, the top layer comprises 1-3 layers and has a thickness in the range of 50 μm-150 μm, the second layer comprises 1-11 layers, the lamitube further comprises at least one first adhesive layer present between the top layer and the first surface of second layer, and the lamitube further comprises a third layer, wherein the third layer is a sealant layer.

In an embodiment of the present disclosure, there is provided a lamitube as described herein, wherein the lamitube further comprises at least one second adhesive layer present between the third layer and the second surface of the second layer.

In an embodiment of the present disclosure there is provided a lamitube comprising: a) a top layer comprising at least one ethylene polymer; and b) a second layer comprising at least one ethylene polymer having a first surface and a second surface, wherein the lamitube has a density in the range of 0.942-0.99 gm/cm³, the lamitube further comprises at least one first adhesive layer present between the top layer and the first surface of second layer, the lamitube further comprises a third layer, wherein the third layer is a sealant layer, and the lamitube further comprises at least one second adhesive layer present between the third layer and the second surface of the second layer.

In an embodiment of the present disclosure there is provided a lamitube comprising: a) a top layer comprising at least one ethylene polymer; and b) a second layer comprising at least one ethylene polymer having a first surface and a second surface, wherein the lamitube has a density in the range of 0.942-0.99 gm/cm³, the lamitube has a tube ovality in the range of 1-8%, the top layer comprises 1-3 layers and has a thickness in the range of 50 μm-150 μm, the second layer comprises 1-11 layers, the lamitube further comprises at least one first adhesive layer present between the top layer and the first surface of second layer, the lamitube further comprises a third layer, wherein the third layer is a sealant layer, and the lamitube further comprises at least one second adhesive layer present between the third layer and the second surface of the second layer.

In an embodiment of the present disclosure, there is provided a lamitube as described herein, wherein the second layer is a heat sealable blocking layer.

In an embodiment of the present disclosure, there is provided a lamitube as described herein, wherein the second layer is the sealant layer and is in contact with the top layer.

In an embodiment of the present disclosure, there is provided a lamitube as described herein, wherein the heat sealable blocking layer comprises 3-11 layers and has a thickness in the range of 50 μm-150 μm. In one another embodiment of the present disclosure, the heat sealable blocking layer comprises 3-10 layers. In yet another embodiment of the present disclosure, the heat sealable blocking layer comprises 3-7 layers. In one another embodiment of the present disclosure, the heat sealable blocking layer has a thickness in the range of 55 μm-150 μm. In yet another embodiment of the present disclosure, the heat sealable blocking layer has a thickness in the range of 65 μm-150 μm.

In an embodiment of the present disclosure, there is provided a lamitube as described herein, wherein the heat sealable blocking layer comprises EVOH having a weight percentage in the range of 1-10% with respect to the lamitube. In one another embodiment of the present disclosure, the heat sealable blocking layer comprises EVOH having a weight percentage in the range of 2-9% with respect to the lamitube. In yet another embodiment of the present disclosure, the heat sealable blocking layer comprises EVOH having a weight percentage in the range of 3.5-7.5% with respect to the lamitube. In one another embodiment of the present disclosure, the heat sealable blocking layer comprises EVOH having a weight percentage of 5% with respect to the lamitube.

In an embodiment of the present disclosure there is provided a lamitube comprising: a) a top layer comprising at least one ethylene polymer; and b) a second layer comprising at least one ethylene polymer having a first surface and a second surface, wherein the lamitube has a density in the range of 0.942-0.99 gm/cm³, the second layer is heat sealable blocking layer comprising 3-11 layers, has a thickness in the range of 50 μm-150 μm and comprises EVOH having a weight percentage in the range of 1-10% with respect to the lamitube.

In an embodiment of the present disclosure, there is provided a lamitube as described herein, wherein the sealant layer comprises 1-3 layers and has a thickness in the range of 50 μm-180 μm. In one another embodiment of the present disclosure, the sealant layer comprises 1-3 layers and has a thickness in the range of 55 μm-150 μm. In yet another embodiment of the present disclosure, the sealant layer comprises 1-3 layers and has a thickness in the range of 65 μm-150 μm.

In an embodiment of the present disclosure, there is provided a lamitube as described herein, wherein the heat sealable blocking layer comprises a core layer, an outer layer, and an inner layer.

In an embodiment of the present disclosure there is provided a lamitube comprising: a) a top layer comprising at least one ethylene polymer; and b) a second layer comprising at least one ethylene polymer having a first surface and a second surface, wherein the lamitube has a density in the range of 0.942-0.99 gm/cm$^3$, the second layer is heat sealable blocking layer comprising 3-11 layers, has a thickness in the range of 50 μm-150 μm and comprises a core layer, an outer layer, and an inner layer.

In an embodiment of the present disclosure there is provided a lamitube comprising: a) a top layer comprising at least one ethylene polymer; and b) a second layer comprising at least one ethylene polymer having a first surface and a second surface, wherein the lamitube has a density in the range of 0.942-0.99 gm/cm$^3$, the second layer is heat sealable blocking layer comprising 3-11 layers has a thickness in the range of 50 μm-150 μm and comprises EVOH having a weight percentage in the range of 1-10% with respect to the lamitube, and the heat sealable blocking layer comprises a core layer, an outer layer, and an inner layer.

In an embodiment of the present disclosure, there is provided a lamitube as described herein, wherein the heat sealable blocking layer further comprises at least one third adhesive layer.

In an embodiment of the present disclosure, there is provided a lamitube as described herein, wherein the core layer, the outer layer, the inner layer, and the at least one third adhesive layer independently is a single or multilayer structure.

In an embodiment of the present disclosure there is provided a lamitube comprising: a) a top layer comprising at least one ethylene polymer; and b) a second layer comprising at least one ethylene polymer having a first surface and a second surface, wherein the lamitube has a density in the range of 0.942-0.99 gm/cm$^3$ and the second layer is heat sealable blocking layer and the heat sealable blocking layer comprises 3-11 layers and has a thickness in the range of 50 μm-150 μm and the heat sealable blocking layer comprises a core layer, an outer layer, and an inner layer and the heat sealable blocking layer further comprises at least one third adhesive layer and the core layer, the outer layer, the inner layer, and the at least one third adhesive layer independently is a single or multilayer structure.

In an embodiment of the present disclosure, there is provided a lamitube as described herein, wherein the at least one first adhesive layer, the at least one second adhesive layer, and the at least one third adhesive layer independently has a thickness in the range of 20 μm-40 μm. In one another embodiment of the present disclosure, the at least one first adhesive layer, the at least one second adhesive layer, and the at least one third adhesive layer independently has a thickness in the range of 20 μm-25 μm. In yet another embodiment of the present disclosure, the at least one first adhesive layer, the at least one second adhesive layer, and the at least one third adhesive layer independently has a thickness in the range of 28 μm-32 μm.

In an embodiment of the present disclosure, there is provided a lamitube as described herein, wherein the at least one first adhesive layer, the at least one second adhesive layer, and the at least one third adhesive layer comprises ethylene polymer having a density in the range of 0.930-0.962 gm/cm$^3$. In one another embodiment of the present disclosure, the at least one first adhesive layer and the at least one second adhesive layer comprises ethylene polymer having a density in the range of 0.932-0.960 gm/cm$^3$. In yet another embodiment of the present disclosure, the at least one first adhesive layer and the at least one second adhesive layer comprises ethylene polymer having a density in the range of 0.936-0.955 gm/cm$^3$.

In an embodiment of the present disclosure there is provided a lamitube comprising: a) a top layer comprising at least one ethylene polymer; and b) a second layer comprising at least one ethylene polymer having a first surface and a second surface, wherein the lamitube has a density in the range of 0.942-0.99 gm/cm$^3$ and the lamitube further comprises at least one first adhesive layer present between the top layer and the first surface of second layer and the at least one first adhesive layer, the at least one second adhesive layer, and the at least one third adhesive layer independently has a thickness in the range of 20 μm-40 μm and the at least one first adhesive layer and the at least one second adhesive layer comprises ethylene polymer having a density in the range of 0.930-0.962 gm/cm$^3$.

In an embodiment of the present disclosure there is provided a lamitube comprising: a) a top layer comprising at least one ethylene polymer; and b) a second layer comprising at least one ethylene polymer having a first surface and a second surface, wherein the lamitube has a density in the range of 0.942-0.99 gm/cm$^3$ and the lamitube further comprises a third layer, wherein the third layer is a sealant layer and the at least one first adhesive layer, the at least one second adhesive layer, and the at least one third adhesive layer independently has a thickness in the range of 20 μm-40 μm and the at least one first adhesive layer and the at least one second adhesive layer comprises ethylene polymer having a density in the range of 0.930-0.962 gm/cm$^3$.

In an embodiment of the present disclosure, there is provided a lamitube as described herein, wherein the top layer and the sealant layer independently has a resin composition comprising: at least one ethylene polymer having a melt flow index in the range of 0.5-1.2 g/10 minutes and a density in the range of 0.942-0.99 gm/cm$^3$. In one another embodiment of the present disclosure, the top layer and the sealant layer independently has a resin composition comprising: at least one ethylene polymer having a melt flow index in the range of 0.6-1.1 g/10 minutes. In yet another embodiment of the present disclosure, the top layer and the sealant layer independently has a resin composition comprising: at least one ethylene polymer having a melt flow index in the range of 0.7-1.0 g/10 minutes. In one another embodiment of the present disclosure, the top layer and the sealant layer independently has a resin composition comprising: at least one ethylene polymer having a density in the range of 0.945-0.978 gm/cm$^3$. In yet another embodiment of the present disclosure, the top layer and the sealant layer independently has a resin composition comprising: at least one ethylene polymer having a density in the range of 0.948-0.975 gm/cm$^3$. In one another embodiment of the present disclosure, the top layer and the sealant layer independently has a resin composition comprising: at least one ethylene polymer having a melt flow index in the range of 0.6-1.1 g/10 minutes and a density in the range of 0.945-0.978 gm/cm$^3$.

In an embodiment of the present disclosure, there is provided a lamitube as described herein, wherein the resin composition comprises a colorant master batch having a weight percentage in the range of 0-10% with respect to the resin composition. In one another embodiment of the present disclosure, the resin composition comprises a colorant master batch having a weight percentage in the range of 2-8% with respect to the resin composition. In yet another embodiment of the present disclosure, the resin composition comprises a colorant master batch having a weight percentage in the range of 3-7% with respect to the resin composition. In one another embodiment of the present disclosure, the resin composition does not comprise the colorant master batch.

In an embodiment of the present disclosure, there is provided a lamitube as described herein, wherein the colorant master batch comprises at least one pigment selected from the group consisting of titanium dioxide ($TiO_2$), zinc sulphide ($ZnS_2$), zinc oxide (ZnO), barium sulfate ($BaSO_4$), and calcium carbonate ($CaCO_3$). In another embodiment of the present disclosure, a white colorant master batch is made from titanium dioxide ($TiO_2$).

In an embodiment of the present disclosure, there is provided a lamitube as described herein, wherein the lamitube has a stiffness in the range of 200-1300 mg. In one another embodiment of the present disclosure, the lamitube has a stiffness in the range of 240-960 mg. In yet another embodiment of the present disclosure, the lamitube has a stiffness in the range of 250-955 mg. The stiffness of the lamitube may be tested by TAPPI T556 standard method.

In an embodiment of the present disclosure, there is provided a lamitube as described herein, wherein the lamitube has a young's modulus in the range of 600-1000 MPa. In one another embodiment of the present disclosure, the lamitube has a young's modulus in the range of 650-900 MPa. In yet another embodiment of the present disclosure, the lamitube has a young's modulus in the range of 665-860 MPa. The young's modulus may be tested by ASTM D882 method.

In an embodiment of the present disclosure there is provided a lamitube comprising: a) a top layer comprising at least one ethylene polymer; and b) a second layer comprising at least one ethylene polymer having a first surface and a second surface, wherein the lamitube has a density in the range of 0.942-0.99 gm/cm³ and the lamitube has a stiffness in the range of 200-1000 mg and the lamitube has a young's modulus in the range of 600-1000 MPa.

In an embodiment of the present disclosure, there is provided a lamitube as described herein, wherein lamitube is sustainable.

In an embodiment of the present disclosure, there is provided a lamitube as described herein, wherein the lamitube has a thickness in the range of 170 μm-400 μm. In one another embodiment of the present disclosure, the lamitube has a thickness in the range of 190 μm-395 μm. In yet another embodiment of the present disclosure, the lamitube has a thickness in the range of 210 μm-350 μm.

In an embodiment of the present disclosure there is provided a lamitube as described herein, wherein the lamitube has a tube ovality in the range of 1-8%.

In an embodiment of the present disclosure, there is provided a process for manufacturing the lamitube as described herein, said process comprises the steps of forming the layers and laminating the layers together, then slitting into reels of desired width in the range of 63-320 mm, followed by tubing from the reels. In one another embodiment of the present disclosure, the desired width is in the range of 80-200 mm. In yet another embodiment of the present disclosure, the desired width is in the range of 100-130 mm.

In an embodiment of the present disclosure, there is provided a lamitube comprising: a) a top layer comprising 3 layers having a total thickness in the range of 50-150 μm comprising the at least one ethylene polymer; b) a second layer comprising 1-11 layers having a thickness in the range of 50 μm-150 μm, wherein the second layer is a heat sealable blocking layer comprising EVOH in the weight percentage range of 1-10% with respect to the lamitube; c) a first adhesive layer present between the top layer and the first surface of the second layer comprising the at least one ethylene polymer having a total thickness in the range of 20-40 μm; d) a third layer comprising 3 layers having a thickness in the range of 50-150 μm, wherein the third layer is a sealant layer comprising the at least one ethylene polymer; and e) a second adhesive layer present between the third layer and the second surface of the second layer comprising the at least one ethylene polymer having a total thickness in the range of 20-40 μm, wherein the lamitube has a density in the range of 0.942-0.99 gm/cm³.

In an embodiment of the present disclosure, there is provided a lamitube comprising: a) a top layer comprising 3 layers having a total thickness in the range of 50-150 μm comprising: (1) layer 1 comprising a combination of HDPE and MDPE; (2) layer 2 comprising a combination of HDPE, MDPE and optionally a colorant master batch; and (3) layer 3 comprising a combination of HDPE, MDPE and optionally a colorant master batch; b) a second layer comprising 7 layers having a thickness in the range of 50 μm-150 μm, wherein the second layer is a heat sealable blocking layer comprising: (i) a first surface comprising a combination of HDPE, MDPE and optionally a colorant master batch; (ii) layer 4 comprising HDPE or LDPE based third adhesive layer; (iii) layer 5 comprising EVOH or third adhesive layer; (iv) layer 6 comprising EVOH; (v) layer 7 comprising EVOH or third adhesive layer; (vi) layer 8 comprising HDPE or LDPE based third adhesive layer; and (vii) a second surface comprising a combination of HDPE, MDPE and optionally a colorant master batch, wherein EVOH is in the weight percentage range of 1-10% with respect to the lamitube; c) a first adhesive layer present between the top layer and the first surface of the second layer comprising the at least one ethylene polymer selected from HDPE, LLDPE, LDPE and combinations thereof having a total thickness in the range of 20-40 μm, d) a third layer comprising 3 layers and a thickness in the range of 50-150 μm, wherein the third layer is a sealant layer comprising: (I) layer 1 comprising a combination of HDPE and MDPE; (II) layer 2 comprising a combination of HDPE, MDPE and optionally a colorant master batch; and (III) layer 3 comprising a combination of HDPE and MDPE; and e) a second adhesive layer present between the third layer and the second surface of the second layer comprising the at least one ethylene polymer selected from HDPE, LLDPE, LDPE and combinations thereof having a total thickness in the range of 20-40 μm, wherein the lamitube has a density in the range of 0.942-0.99 gm/cm³.

In an embodiment of the present disclosure, there is provided a lamitube comprising: a) a top layer having 1-3 layers a total thickness in the range of 50 μm-150 μm comprising the at least one ethylene polymer; b) a second layer having 1-11 layers with a total thickness in the range of 50 μm-150 μm, wherein the second layer is a heat sealable blocking layer comprising EVOH having a weight percentage in the range of 1-10% with respect to the lamitube; and c) a first adhesive layer present between the top layer and the first surface of the second layer comprising the at least one ethylene polymer having a total thickness in the range of 20-40 μm comprising, wherein the lamitube has a density in the range of 0.942-0.99 gm/cm³.

In an embodiment of the present disclosure, there is provided a lamitube comprising: a) a top layer having a total thickness of 150 μm comprising 3 layers comprising: (1) layer 1 having a thickness of 30 μm comprising a combination of HDPE and MDPE; (2) layer 2 having a thickness of 90 μm comprising a combination of HDPE, MDPE and optionally a colorant master batch; and (3) layer 3 having a thickness of 30 μm comprising a combination of HDPE, MDPE and optionally a colorant master batch; b) a second layer comprising 7 layers having a thickness in the range of 50 μm-150 μm, wherein the second layer is a heat sealable blocking layer comprising: (i) a first surface comprising a combination of HDPE, MDPE and optionally a colorant master batch; (ii) layer 4 comprising HDPE or LDPE based third adhesive layer; (iii) layer 5 comprising EVOH or third adhesive layer; (iv) layer 6 comprising EVOH; (v) layer 7 comprising EVOH or third adhesive layer; (vi) layer 8 comprising HDPE or LDPE based third adhesive layer; and (vii) a second surface comprising a combination of HDPE, MDPE and optionally a colorant master batch, wherein EVOH is in the weight percentage range of 1-10% with respect to the lamitube; and c) a first adhesive layer present between the top layer and the first surface of the second layer having a thickness of 30 μm comprising a combination of HDPE and LDPE, wherein the lamitube has a density in the range of 0.942-0.99 gm/cm³.

In an embodiment of the present disclosure, there is provided a lamitube having a thickness of 250 μm comprising: a) a top layer having a total thickness of 110 μm comprising 3 layers comprising: (1) layer 1 comprising a combination of HDPE and MDPE; (2) layer 2 comprising a combination of HDPE, MDPE and 10% white colorant master batch; and (3) layer 3 comprising a combination of HDPE and MDPE; b) a second layer comprising 5 layers having a thickness of 50 μm, wherein the second layer is a heat sealable blocking layer comprising: (i) a first surface comprising a combination of HDPE and MDPE; (ii) third adhesive layer comprising a maleic anhydride grafted LLDPE; (iii) core layer comprising EVOH; (iv) third adhesive layer comprising a maleic anhydride grafted LLDPE; and (v) a second surface comprising a combination of HDPE and MDPE, wherein EVOH is in the weight percentage range of 1-10% with respect to the lamitube; c) a first adhesive layer comprising LDPE present between the top layer and the first surface of the second layer having a thickness of 20 μm, d) a third layer comprising 3 layers and a thickness of 50 μm, wherein the third layer is a sealant layer comprising: (I) layer 1 comprising a combination of HDPE and MDPE; (II) layer 2 comprising a combination of HDPE and MDPE; and (III) layer 3 comprising a combination of HDPE and MDPE; and e) a second adhesive layer comprising LDPE present between the third layer and the second surface of the second layer having a thickness of 20 μm, wherein the lamitube has a density in the range of 0.942-0.99 gm/cm³.

In an embodiment of the present disclosure, there is provided a lamitube having a thickness of 300 μm comprising: a) a top layer having a total thickness of 140 μm comprising 3 layers comprising: (1) layer 1 comprising a combination of HDPE and MDPE; (2) layer 2 comprising a combination of HDPE, MDPE and 10% white colorant master batch; and (3) layer 3 comprising a combination of HDPE and MDPE; b) a second layer comprising 5 layers having a thickness of 50 μm, wherein the second layer is a heat sealable blocking layer comprising: (i) a first surface comprising a combination of HDPE and MDPE; (ii) third adhesive layer comprising a maleic anhydride grafted LLDPE; (iii) core layer comprising EVOH; (iv) third adhesive layer comprising a maleic anhydride grafted LLDPE; and (v) a second surface comprising a combination of HDPE and MDPE, wherein EVOH is in the weight percentage range of 1-10% with respect to the lamitube; c) a first adhesive layer comprising LDPE present between the top layer and the first surface of the second layer having a thickness of 20 μm, d) a third layer comprising 3 layers and a thickness of 70 μm, wherein the third layer is a sealant layer comprising: (I) layer 1 comprising a combination of HDPE and MDPE; (II) layer 2 comprising a combination of HDPE and MDPE; and (III) layer 3 comprising a combination of HDPE and MDPE; and e) a second adhesive layer comprising LDPE present between the third layer and the second surface of the second layer having a thickness of 20 μm, wherein the lamitube has a density in the range of 0.942-0.99 gm/cm³.

In an embodiment of the present disclosure, there is provided a lamitube having a thickness of 350 μm comprising: a) a top layer having a total thickness of 150 μm comprising 3 layers comprising: (1) layer 1 comprising a combination of HDPE and MDPE; (2) layer 2 comprising a combination of HDPE, MDPE and 10% white colorant master batch; and (3) layer 3 comprising a combination of HDPE and MDPE; b) a second layer comprising 5 layers having a thickness of 50 μm, wherein the second layer is a heat sealable blocking layer comprising: (i) a first surface comprising a combination of HDPE and MDPE; (ii) third adhesive layer comprising a maleic anhydride grafted LLDPE; (iii) core layer comprising EVOH; (iv) third adhesive layer comprising a maleic anhydride grafted LLDPE; and (v) a second surface comprising a combination of HDPE and MDPE, wherein EVOH is in the weight percentage range of 1-10% with respect to the lamitube; c) a first adhesive layer comprising LDPE present between the top layer and the first surface of the second layer having a thickness of 20 μm, d) a third layer comprising 3 layers and a thickness of 110 μm, wherein the third layer is a sealant layer comprising: (I) layer 1 comprising a combination of HDPE and MDPE; (II) layer 2 comprising a combination of HDPE and MDPE; and (III) layer 3 comprising a combination of HDPE and MDPE; and e) a second adhesive layer comprising LDPE present between the third layer and the second surface of the second layer having a thickness of 20 μm, wherein the lamitube has a density in the range of 0.942-0.99 gm/cm³.

Although the subject matter has been described in considerable detail with reference to certain preferred embodiments thereof, other embodiments are possible.

ABBREVIATIONS

LDPE: low density polyethylene
LLDPE: linear-low density polyethylene
MDPE: medium density polyethylene
MB: master batch
MD: machine direction;
TD: Transverse direction;
MPa denotes mega-pascal;
μm denotes microns or micrometre;
mg denotes milligram

EXAMPLES

The disclosure will now be illustrated with working examples, which is intended to illustrate the working of disclosure and not intended to take restrictively to imply any limitations on the scope of the present disclosure. Unless defined otherwise, all technical and scientific terms used herein have the same meaning as commonly understood to one of ordinary skill in the art to which this disclosure belongs. Although methods and materials similar or equivalent to those described herein can be used in the practice of the disclosed methods and compositions, the exemplary methods, devices and materials are described herein. It is to be understood that this disclosure is not limited to particular methods, and experimental conditions described, as such methods and conditions may apply.

Example 1

Preparation of Lamitube of the Present Disclosure

A process of manufacturing the lamitube comprises the steps of forming the layers and laminating the layers together, then slitting into reels of desired width (63 to 320 mm), followed by tubing from the reels. The exemplary lamitubes are illustrated below:

Structure 1:
Top layer (3-layer film); Thickness range: 50-150 μm;
   Layer 1 [HDPE (15%-85%)+MDPE (85%-15%)];
   Layer 2 [HDPE (15%-70%)+MDPE (70%-15%)+15% optional colorant master batch];
   Layer 3 [HDPE (15%-70%)+MDPE (70%-15%)+15% optional colorant master batch];
First adhesive layer; Thickness range: 20-40 μm;
   [HDPE (0%-50%)+LDPE (100%-50%)]
Heat sealable blocking layer; Thickness range: 50-150 μm;
First surface [HDPE (50%-70%)+MDPE (50%-15%)+15% optional colorant master batch]
   Layer 4 [HDPE or LLDPE based third adhesive layer]
   Layer 5 [EVOH or third adhesive layer]
   Layer 6 [EVOH] (core layer)
   Layer 7 [EVOH or third adhesive layer]
   Layer 8 [HDPE or LLDPE based third adhesive layer]
Second surface [HDPE (50%-70%)+MDPE (50%-15%)+15% optional colorant master batch]
Second adhesive layer; Thickness range: 20-40 μm;
   [HDPE (0%-50%)+LDPE (100%-50%)]
Sealant layer (3-layer film); Thickness range: 50-150 μm;
   Layer 9 [HDPE (15%-85%)+MDPE (85%-15%)]
   Layer 10 [HDPE (15%-70%)+MDPE (70%-15%)+15% optional colorant master batch]
   Layer 11 [HDPE (15%-85%)+MDPE (85%-15%)]

Structure 2:
Top layer (3-layer film); Thickness: 150 μm;
   Layer 1 [HDPE (15%-85%)+MDPE (85%-15%)]; 30 μm
   Layer 2 [HDPE (15%-70%)+MDPE (70%-15%)+15% optional colorant master batch]; 90 μm
   Layer 3 [HDPE (15%-70%)+MDPE (70%-15%)+15% optional colorant master batch]; 30 μm
First adhesive layer; Thickness: 30 μm;
   [HDPE (0%-50%)+LDPE (100%-50%)]; 30 μm
Heat sealable blocking layer; Thickness range: 50-150 μm;
First surface [HDPE (50%-70%)+MDPE (50%-15%)+15% optional colorant master batch]
   Layer 4 [HDPE or LLDPE based third adhesive layer]
   Layer 5 [EVOH or third adhesive layer]
   Layer 6 [EVOH] (core layer)
   Layer 7 [EVOH or third adhesive layer]
   Layer 8 [HDPE or LLDPE based third adhesive layer]
Second surface [HDPE (50%-70%)+MDPE (50%-15%)+15% optional colorant master batch]

In further examples, lamitubes having thickness of 250 μm, 300 μm, and 350 μm were prepared with the layer wise distribution as depicted in Table 1. Similarly, other lamitubes with thickness 220 μm, and 390 μm were also prepared and included in testing for the mechanical properties.

| Lamitube layers | Layer wise distribution | 250 μm | 300 μm | 350 μm |
|---|---|---|---|---|
| Top Layer Thickness ratio: 1:2:1 | Layer 1 [HDPE (30%) + MDPE (70%)] Layer 2 [HDPE (60%) + MDPE (30%) + 10% - White MB] Layer 3 [HDPE (30%) + MDPE (70%)] | 110 | 140 | 150 |
| First adhesive layer | LDPE - 100% | 20 | 20 | 20 |
| Heat sealable blocking layer | First surface [HDPE (30%) + MDPE (70%)] | 10 | 10 | 10 |
| | Third adhesive layer (MA-g-LLDPE) | 7.5 | 7.5 | 7.5 |
| | EVOH (core layer) | 15 | 15 | 15 |
| | Third adhesive layer (MA-g-LLDPE) | 7.5 | 7.5 | 7.5 |
| | Second surface [HDPE (30%) + MDPE (70%)] | 10 | 10 | 10 |
| Second adhesive layer | LDPE - 100% | 20 | 20 | 20 |
| Sealant layer Thickness ratio: 1:2:1 | Layer 1 [HDPE (30%) + MDPE (70%)] Layer 2 [HDPE (70%) + MDPE (30%) Layer 3 [HDPE (30%) + MDPE (70%)] | 50 | 70 | 110 |

Structure of Comparative Example
Top layer (3-layer film); Thickness: 150 μm;
  Layer 1 [LLDPE (100%)]; 30 μm
  Layer 2 [LDPE (70%)+LLDPE (15%)+MB (15%)]; 90 μm
  Layer 3 [LLDPE (100%)]; 30 μm
First adhesive layer; Thickness: 30 μm;
  [HDPE (0%)+LDPE (100%)]; 30 μm
Heat sealable blocking layer; Thickness: 55 μm;
  Layer 1 [LLDPE (100%)]
  Layer 2 [LLDPE based binding layer]
  Layer 3 [EVOH]
  Layer 4 [EVOH]
  Layer 5 [EVOH or binding layer]
  Layer 6 [LLDPE based binding layer]
  Layer 7 [LLDPE (100%)
Second adhesive layer; Thickness: 30 μm;
  [HDPE (0%)+LDPE (100%)]; 30 μm
Sealant layer (3-layer film); Thickness: 85 μm;
  Layer 1 [LLDPE (100%)]; 17 μm
  Layer 2 [LDPE (70%)+LLDPE (15%)+MB (15%)]; 51 μm
  Layer 3 [LLDPE (100%)]; 17 μm.

Example 2

Resilience and Stiffness Tests: Tube Length –115 mm

Mechanical properties of the lamitubes (as prepared in Example 1) having thickness 220 μm, 250 μm, 350 μm, and 390 μm were tested. Stiffness (mg) and young's modulus of the lamitubes was measured, the results for which are illustrated in Table 2. Comparative tests were conducted on a commercial lamitube having thickness 350 μm and the results are recorded in the Table 2 below. The stiffness test was conducted on the lamitubes by following the TAPPI T556 standard method. Young's modulus was measured by following ASTM D882. Similarly, resilience and bounce back tests were also conducted.

TABLE 2

| S.No. | Thickness (μm) | Stiffness (mg) | | Young's Modulus | |
|---|---|---|---|---|---|
| | | MD | TD | MD | TD |
| Lamitube | | | | | |
| 1 | 220 | 254 | 270 | 725 | 770 |
| 2 | 250 | 369 | 407 | 824 | 830 |
| 3 | 350 | 781 | 860 | 679 | 717 |
| 4 | 390 | 944 | 950 | 697 | 711 |
| Comparative Example | | | | | |
| 5 | 350 | 612 | 700 | 499 | 535 |

It can be observed with the data revealed in Table 1 that the stiffness of the lamitubes increased with increasing thickness from 220 μm-390 μm. On the other hand, the young's modulus of the films did not show any particular trend. It is also clear from the Table 1 that the resin selection and orientation method are the primary variables that influence tensile values and thereby the stiffness of the lamitube. The value of young's modulus reflects the tensile modulus. Observing a higher modulus for the lamitube 3 having the same thickness as that of the comparative example indicated, that the lamitube was more stiffer and hence, had more resistance to elongation. Moreover, the present lamitubes despite the thickness being on the lower side, i.e., within the range of 220-390 μm, did not show any reduction in the stiffness of the film.

Example 3

Lamitube Ovality

To ensure that ovality of tubes does not exceed a certain limit, experiments were conducted by two methods, measurement method A and measurement method B. Vernier Calipers with least count of 0.01 were used.

In the mesurement method A, the outside diameter of the tube at the extremity of the shoulder was measured. On the same tube, the outside diameter of the open end of tube (maximum diameter at the open end circumference of the tube) was measured. Caution was taken to read value with the minimum contact between calipers and tube since this can lower the reading.

In the measurement method B, prefrabricated gauge method was used. In this method, ring gauges were made based on the below given formula for percentage out of roundness. Tubes were passed through these ring gauges of specific ovality. If a tube passes through 8% ovality ring gauges and doesn't pass through 6% ovality ring gauge, it implies that ovality of tube is more than 6% and less than 8%. Hence, using the above two methods, the ovality of the present lamitube was found to be in the range of 1-8%.

$$\% \text{ out of roundness} = \frac{D\max - Ds}{Ds} \times 100$$

where $D_{max}$=Maximum diameter at open end of tube
$Ds$=Tube diameter at the shoulder Example 4

Lamitube Recyclability

Various parameters, such as, melt flow index, density, and screen pack pressure were calculated for the lamitube of the present disclosure. The test methods used for these experiments are listed in the Table 3 below.

One of the well-established recycle streams is blow moulded HDPE bottles. The properties of the recycled HDPE resin obtained from present lamitube can be compared with this established recycle stream to establish equivalence in performance.

For this study, the properties of a blend of 50% recycled HDPE lamitube based resin+50% recycled HDPE blown bottle grade resin (test) was compared with 100% recycled HDPE blown bottle grade (control). Table 3 illustrates the results obtained for the 250 μm lamitube and Table 4 illustrates the results for 300 μm lamitube.

TABLE 3

| Property | Critical value | Control | Test 250 μm |
|---|---|---|---|
| Melt flow index (g/10 min) | ASTM: D1238 0.2 to 0.7 g/10 minutes | 0.271 | 0.462 |
| Density (g/cm³) | ASTM: D792 ±0.010 from the control value | 0.936 | 0.927 |
| Screen pack pressure | <10% pressure increase from control sample to test sample | N/A | 3.61% |
| % Volatiles in pellets | <0.1% absolute difference from control sample to test sample | 0.0165 | 0.0312 |

TABLE 3-continued

| Property | Critical value | Control | Test 250 μm |
|---|---|---|---|
| % Polypropylene in pellets | ASTM: D7399 <2% polypropylene to control and test samples. Not to exceed 4% polypropylene | <1% | <1% |
| Pellet colour L* | For natural HDPE** >63 | 81.35 | 91.95 |
| Pellet colour a* | For natural HDPE** >−4.5 | −1.20 | −0.76 |
| Pellet colour b* | For natural HDPE** <13 | 2.74 | 4.34 |

TABLE 4

| Property | Critical Value | Control | Test - 300 μm |
|---|---|---|---|
| Melt flow index (g/10 min) | ASTM D1238: <0.75 g/10 minutes delta to control | 0.338 | 0.544 |
| Density (g/cm³) | ASTM D792: <1 g/cc for control and test | 0.955 | 0.965 |
| Screen pack pressure delta | No guidance | N/A | −4.50% |
| Screen pack pressure build | End pressure no greater than 25% over starting pressure value | 5.80% | 3.30% |
| % Volatiles in pellets | <0.5% | 0.0065 | 0.0084 |
| % Polypropylene in pellets | ASTM D7399: <5% PP in test sample B (up to 10% allowable in innovation) | <5% | <5% |
| Differential scanning calorimeter (DSC) testing | ASTM D3418: Primary peak not to exceed 150° C. | 130.7 | 129.17 |
| Pellet colour L* | For natural HDPE, >63, All samples (guidance only required for homopolymers) | 81.51 | 93.55 |
| Pellet colour a* | For natural HDPE, >−4.5, All samples (guidance only required for homopolymers) | −0.9 | −0.88 |
| Pellet colour b* | For natural HDPE, <13, All samples (guidance only required for homopolymers) | 4.15 | 4.38 |

**Guidance required only for homopolymers

As can be seen from the Table 3 above, both the test lamitubes (250 μm and 300 μm) obtained from recycled material of the present lamitubes showed equivalent performance as per the standard recycled material. Hence, the present lamitubes can be recycled in code 2 (HDPE) stream as the values for all the parameters falls within the specification of the benchmark resin.

Advantages of the Present Disclosure:

The lamitube composition as disclosed in the present disclosure has a high density in the range of 0.942-0.99 gm/cm³, which allows easy recyclability in the HDPE recycling stream. The present lamitubes also overcomes the problem of achieving desired ovality by offering lamitubes having low ovality in the range of 1-8%. The stiffness of the lamitubes of the present disclosure with thickness in the range of 170 μm-400 μm is higher almost by 15-30% as compared to the commercial lamitubes of the same thickness, thereby enabling source i.e., the lamitube thickness is reduced without affecting the essential functionalities such as, stability, stiffness, and elongation in use.

I claim:

1. A lamitube comprising:
   a top layer comprising a combination of high density polyethylene (HDPE) and medium density polyethylene (MDPE);
   a second layer comprising at least one ethylene polymer having a first surface and a second surface;
   at least one first adhesive layer present between the top layer and the first surface of the second layer;
   a third layer, wherein the third layer is a sealant layer; and
   at least one second adhesive layer present between the third layer and the second surface of the second layer,
   wherein the lamitube has a density in the range of 0.942-0.990 g/cm³, and has recyclability in a HDPE recycling stream,
   wherein the second layer is a heat sealable blocking layer,
   wherein the heat sealable blocking layer comprises 4-11 layers and has a thickness in the range of 50 μm-150 μm,
   wherein the heat sealable blocking layer comprises a core layer, an outer layer, an inner layer, and at least one third adhesive layer, and
   wherein at least one of the core layer, the outer layer, the inner layer, and the at least one third adhesive layer is a multilayer structure.

2. The lamitube as claimed in claim 1, wherein the lamitube has a tube ovality in the range of 1-8%.

3. The lamitube as claimed in claim 1, wherein the top layer comprises 1-3 layer and has a thickness in the range of 50 μm-150 μm.

4. The lamitube as claimed in claim 1, wherein the second layer comprises 5-11 layers.

5. The lamitube as claimed in claim 1, wherein the heat sealable blocking layer comprises EVOH having a weight percentage in the range of 1-10% with respect to the lamitube.

6. The lamitube as claimed in claim 1, wherein the sealant layer comprises 1-3 layers and has a thickness in the range of 50 μm-180 μm.

7. The lamitube as claimed in claim 1, wherein at least one of the top layer and the sealant layer comprises a resin composition comprising a colorant master batch having a weight percentage in the range of 2-8% with respect to the resin composition.

8. The lamitube as claimed in claim 1, wherein the lamitube has a stiffness in the range of 200-1300 mg, measuring by TAPPI (Technical Association of the Pulp and Paper Industry) T566 standard method.

9. The lamitube as claimed in claim 1, wherein the lamitube has a Young's modulus in the range of 600-1000 MPa, measuring by ASTM (American Society for Testing and Materials) D882 method.

10. The lamitube as claimed in claim 1, wherein the lamitube has a thickness in the range of 170 μm-400 μm.

11. A lamitube comprising:
- a top layer comprising a combination of high density polyethylene (HDPE) and medium density polyethylene (MDPE);
- a second layer comprising at least one ethylene polymer having a first surface and a second surface;
- at least one first adhesive layer present between the top layer and the first surface of the second layer;
- a third layer, wherein the third layer is a sealant layer; and
- at least one second adhesive layer present between the third layer and the second surface of the second layer,
- wherein the lamitube has a density in the range of 0.942-0.990 g/cm$^3$, and has recyclability in a HDPE recycling stream,
- wherein the second layer is a heat sealable blocking layer, wherein the heat sealable blocking layer comprises 4-11 layers and has a thickness in the range of 50 μm-150 μm,
- wherein the heat sealable blocking layer comprises a core layer, an outer layer, an inner layer, and at least one third adhesive layer, and
- wherein at least one of the at least one first adhesive layer, the at least one second adhesive layer, and the at least one third adhesive layer has a thickness in the range of 20 μm-40 μm.

12. The lamitube as claimed in claim 11, wherein the at least one first adhesive layer, the at least one second adhesive layer, and the at least one third adhesive layer comprises ethylene polymer having a density in the range of 0.930-0.962 gm/cm$^3$.

13. A process of manufacturing the lamitube as claimed in claim 1, said process comprises forming the layers and laminating the layers together, then slitting into reels of desired width in the range of 63-320 mm, followed by forming the reels into tubing.

* * * * *